July 22, 1952 W. VAN GUILDER 2,603,867
BUTTER GUN
Filed Feb. 10, 1950
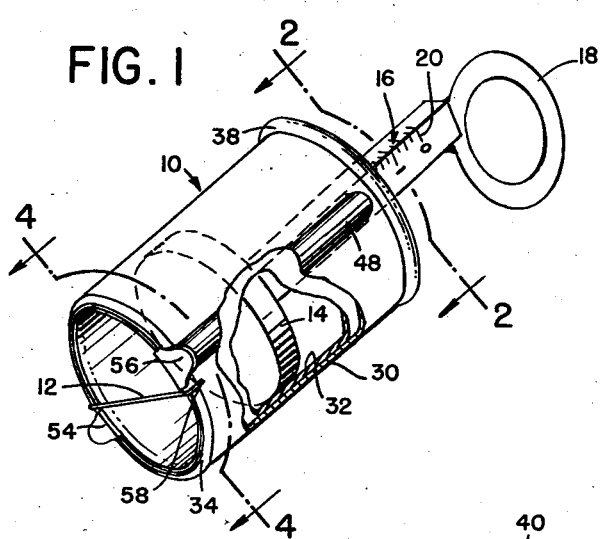
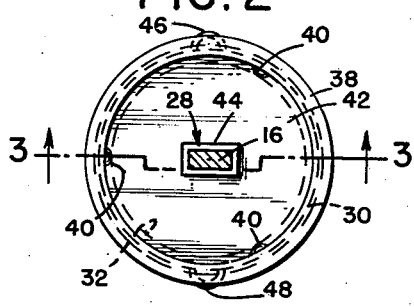
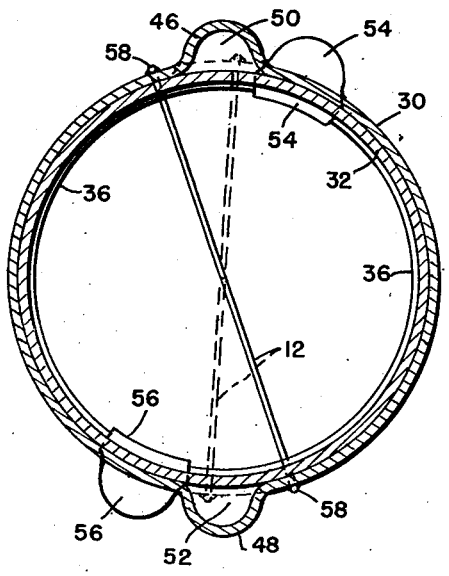
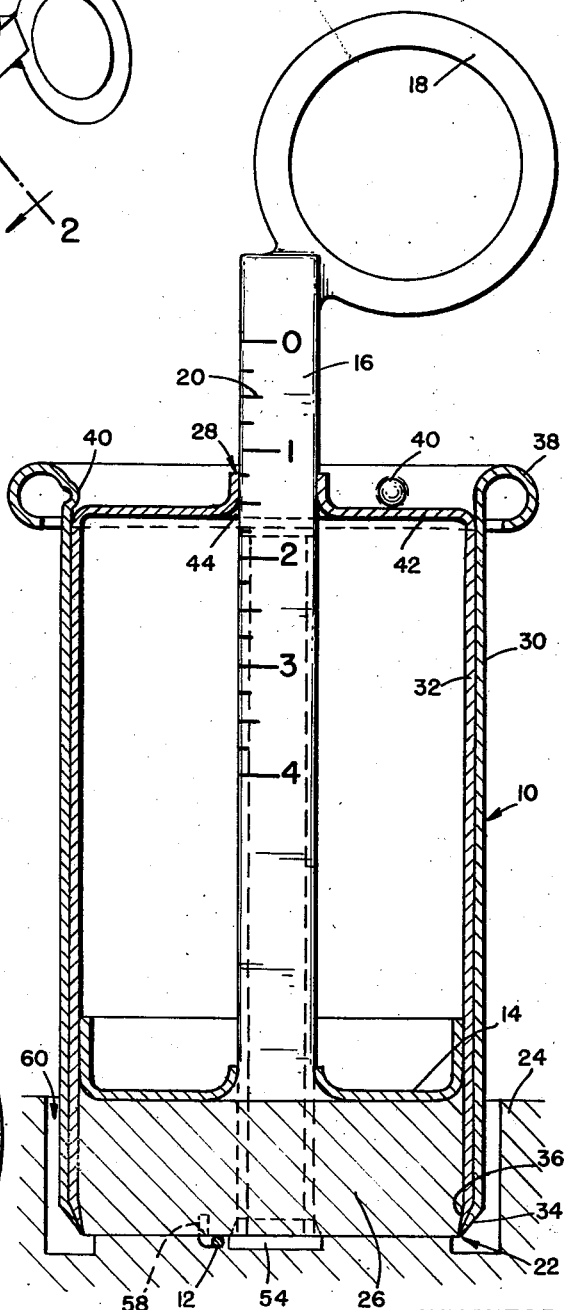
INVENTOR:-
WALTER VAN GUILDER
BY *William C. Babcock* ATTORNEY Patented July 22, 1952

2,603,867

UNITED STATES PATENT OFFICE 2,603,867

BUTTER GUN

Walter Van Guilder, River Forest, Ill., assignor to General Mills, Inc., a corporation of Delaware Application February 10, 1950, Serial No. 143,381

2 Claims. (Cl. 31—11)

The present invention relates to improved devices for cutting and removing a predetermined measured amount of a semisolid material from a larger body of the same. One application of the invention is in the cutting and measurement of butter or similar cooking ingredients from bulk quantities of the same.

It is one object of the present invention to provide an improved measuring device for semisolid material which facilitates the cutting and removal of predetermined amounts of the material from bulk quantities thereof.

Another object is the provision of an improved cutting device in which provision is made for introduction of air beneath the particular block of material to be removed.

A further object is the provision of a measuring device of this general type which is simple to construct and easy to manipulate.

Other objects and advantages will be apparent from the following specification in which a preferred embodiment of the invention has been described.

In the drawings which form a part of this application,

Figure 1 is a perspective view, with certain portions broken away, of an improved butter gun incorporating features of the invention.

Fig. 2 is a sectional view on the line 2—2 of Fig. 1.

Fig. 3 is an enlarged sectional view on the line 3—3 of Fig. 2.

Fig. 4 is an enlarged sectional view on the line 4—4 of Fig. 1, but with certain portions of the device rotated to a different position.

As shown in the drawings, the butter gun according to the present invention includes a substantially cylindrical open-ended shell indicated generally at 10. Across the open end of the shell, a wire 12 or equivalent thin cutting device is attached.

Within the cylindrical shell 10 a plunger 14 is located, the plunger being mounted for axial movement toward and away from the end of the shell in which the cutting wire 12 is located. A shaft or handle 16 extends from the plunger out through the opposite end of the shell and is provided with a finger ring 18 for convenience in manipulation.

The handle shaft 16 is provided with an indicating scale or indicia 20 adapted to show the total volume within the shell between the cutting wire 12 and the face of plunger 14. For convenience in connection with recipes used in cooking, the scale graduations may be in terms of tablespoons, ounces, or any other desired quantities.

In operation, the shell 10 is inserted in a bulk mass of the particular material, such as butter, in the manner shown in Fig. 3. As the lower end 22 of shell 10 is forced down into the butter or other material, the face of plunger 14 engages the upper surface of the material and the plunger and shaft 16 accordingly move upwardly relative to the rest of the shell until the desired quantity is indicated by scale 20. Thus scale 20 will show the amount of material 24 which is included in the space indicated at 26 between the lower base of plunger 14 and the cutting wire 12.

In this particular case the scale 20 is adapted to cooperate with an edge 28 of the shell to give the necessary reading.

Once the shell has been inserted to the desired extent, it is then possible to rotate the shell so that the cutting wire 12 completely severs the volume of material at 26 from the remainder of the bulk quantity. The specific volume of material may then be lifted and removed. To discharge the plug of material 26 from the device, it is only necessary to push the plunger 14 axially so as to force the material past the cutting wire 12 and out of the open end of the cylindrical shell.

According to one feature of the present invention, the shell 10 is made of two cooperating parts. These parts are in the form of concentric outer and inner cylindrical open-ended shells 30 and 32 respectively. At their lower ends, the shells 30 and 32 are tapered inwardly so that the annular inwardly tapering portion 34 of the outer shell is located outside of and below the lower edge portion 36 of the inner shell. This arrangement serves the double purpose of preventing relative movement of the inner shell 32 downwardly with respect to the outer shell 30, and also of preventing butter or other material from passing upwardly between the shell portions to any substantial extent.

The upper end of the outer shell 30 is provided with an external bead 38 which reinforces this end of the shell portion and also serves as a convenient handle portion which may be gripped between the fingers. Projections 40 may be struck inwardly from the upper portion of outer shell 30 to serve as axial stops preventing relative upward movement of the inner shell 32 with respect to the outer shell 30. Since the inner and outer shells 30 and 32 are cylindrical, the shells are adapted for relative rotation with respect to each other about their common axis. At the same time the portions 34 and 40 of the outer shell prevent axial movement of the inner shell in either direction.

At its upper end, the inner shell 32 is provided with a transverse cap portion 42 which effectively closes the upper end of the shells. In the center of this cap portion 42 an unsymmetrical or non-circular opening 44 is provided. In this particular case the opening 44 is rectangular.

Handle shaft 16 of plunger 14 is formed of similar cross section so that it will fit within the opening 44 and so that relative rotation between the handle portion 16 and the inner shell 32 will be prevented. Thus the relative rotary position of the inner shell may be readily controlled by the finger ring or loop 18, while the position of the outer shell is controlled through the gripping portion 38. Application of opposed rotary forces at these two portions of the device will cause relative rotation of the inner and outer shells as desired.

In order to facilitate the removal of the volume of material 26 which is cut from the bulk mass 24 upon insertion and subsequent rotation of the shells, one of these shells is provided with means to provide for passage of air to the region beneath the portion of material 26 which has been severed from the bulk mass. In the present case, the outer shell 30 has been provided with longitudinal projections or enlarged sections 46 and 48 which provide air passages 50 and 52 respectively from one end of the shell to the other. The lower end of the inner shell 32 may be provided with lateral flap portions 54 and 56 designed to fit over the lower ends of the passageways 50 and 52 to prevent material from entering and filling the passageways when the device 10 is inserted to the position of Fig. 3.

The cutting wire 12 extends substantially diametrically across the open end of the shell and may be fastened to the outer shell 30 by having the outer ends of the wire 12 bent upwardly and soldered or welded to the outer surface of shell 30 as indicated at 58.

In operation, the inner and outer shells 30 and 32 will initially be rotated to the position of Fig. 1 so that the flaps 54 and 56 cover the ends of the respective passages. After insertion of the device to the position of Fig. 3, the outer shell may be rotated by manipulating the rim portion 38, so that the cutting wire 12 completely severs the material. Relative rotation between the inner and outer shells may also be caused by manipulation of portions 38 and 18 so that flaps 54 and 56 are moved at least slightly out of line with the passageways 50 and 52. Thus it will be possible to lift the device 10 and the plug of severed material 26 with the necessary air flowing through passages 50 and 52 to relieve any vacuum beneath the material 26.

It should be noted that the relative sizes of the projections 46 and 48 and passages 50 and 52, as well as flaps 54 and 56 have been substantially exaggerated in proportion to the remainder of the device for the sake of clearness in the drawings. In practice, it is desirable that the size of these portions be made as small as possible to avoid interference with the ready insertion and removal of the device from the mass 24. Furthermore, it will be noted that in many cases, where the material 24 has substantial structural rigidity or solidity, the provision of air passages 50 and 52 may be unnecessary. In this case it is only necessary that the cylindrical shell be provided with relatively small projections at the location of portions 46 and 48 so that upon rotation of the outer shell 30, these projecting portions 46 and 48 will squeeze the material away from the shell to leave an air passage indicated at 60 (Fig. 3) around the edges of the device. If the material 24 is sufficiently solid, the annular air passage 60 which is formed in this manner will remain open and will provide the necessary space for air to relieve any vaccum beneath the plug of removed material 26.

Thus in its broadest application, the present invention contemplates the provision of a substantially cylindrical open-ended shell provided with an unsymmetrical or non-circular longitudinal projection on its outer surface, which—upon rotation of the shell—will provide an annular air passage around the device. In its more specific aspects the invention also contemplates the provision of the longitudinal air passages to make the device practical and efficient in connection with more viscous or plastic materials.

As described in the foregoing specification, a butter gun or measuring device has been provided which accomplishes the objects of the present invention, which is simple to manipulate, and which may be easily and economically manufactured.

Since minor variations and changes in the exact details of construction will be apparent to persons skilled in this field, it is intended that this invention shall cover all such changes and modifications as fall within the spirit and scope of the attached claims.

Now, therefore, I claim:

1. A measuring device for semisolid material comprising inner and outer open-ended cylindrical shells mounted for relative rotation on their common axis, a thin cutter secured to one shell and extending across the open end, one of the shells having an air passage extending from the open end to the other end of the shell and the other shell having a cover flap at the open end, movable to open and close the passage on relative rotation of the shells, and a plunger mounted in the inner shell for movement toward and away from the cutting member end, the plunger and shell having cooperating indicating means showing the volume within the shell between the plunger and cutting member.

2. A measuring device for semisolid material comprising inner and outer open-ended cylindrical shells mounted for relative rotation on their common axis, a thin cutter secured to the outer shell and extending across the open end, a plunger mounted in the inner shell for movement toward and away from the cutting member end, and a handle on the plunger projecting from the opposite end of the shells, the handle and inner shell having interfitting portions preventing relative rotation of the shell and plunger, whereby relative rotation of the shells can be obtained by opposed rotary forces applied to the plunger handle and outer shell, and the outer shell having at least one projection on its outer surface extending axially the full length of the shell, said projection including an axially extending air passage and said inner shell having at its lower end a flap movable on relative rotation of the shells selectively closing and exposing the passage.

WALTER VAN GUILDER.

REFERENCES CITED

The following references are of record in the file of this patent:

UNITED STATES PATENTS

| Number | Name | Date |
|---|---|---|
| 142,207 | Colbrunn | Aug. 26, 1873 |
| 265,380 | Bryan | Oct. 2, 1882 |
| 447,286 | Bailey et al. | Mar. 3, 1891 |
| 1,595,660 | Huntley | Aug. 10, 1926 |
| 2,328,995 | Olds | Sept. 7, 1943 |